US012576417B2

(12) United States Patent
Moore et al.

(10) Patent No.: US 12,576,417 B2
(45) Date of Patent: Mar. 17, 2026

(54) DEVICES AND METHODS FOR THE DEFLECTION OF FLUID

(71) Applicant: Moorphic, Fairview, TX (US)

(72) Inventors: Gary Arthur Moore, Livermore, CA (US); Douglas Alan Moore, Fairview, TX (US)

(73) Assignee: SPLASH GUPPIE LLC, Fairview, TX (US)

(*) Notice: Subject to any disclaimer, the term of this patent is extended or adjusted under 35 U.S.C. 154(b) by 319 days.

(21) Appl. No.: 18/128,026

(22) Filed: Mar. 29, 2023

(65) Prior Publication Data

US 2023/0311146 A1 Oct. 5, 2023

Related U.S. Application Data

(60) Provisional application No. 63/325,019, filed on Mar. 29, 2022.

(51) Int. Cl.
*B05B 12/36* (2018.01)
*B05B 1/28* (2006.01)

(52) U.S. Cl.
CPC ................ *B05B 12/36* (2018.02); *B05B 1/28* (2013.01)

(58) Field of Classification Search
CPC ........... B05B 1/28; B05B 14/30; B05B 12/16; B05B 12/32; B05B 12/36
USPC .............. 239/288–288.5, 499, 516, 517, 519
See application file for complete search history.

(56) References Cited

U.S. PATENT DOCUMENTS

| | | | | | |
|---|---|---|---|---|---|
| 2,047,378 | A * | 7/1936 | Martin | F01N 13/20 239/521 |
| 2,699,357 | A | 1/1955 | Roth | |
| 2,928,610 | A * | 3/1960 | Fenimore | B05B 1/28 239/288.5 |
| 3,092,334 | A * | 6/1963 | Peterson | A47K 3/281 239/524 |
| 4,353,139 | A | 10/1982 | Wainwright | |
| 4,865,257 | A * | 9/1989 | Bailey | B05B 1/28 239/499 |
| 5,028,077 | A | 7/1991 | Hurst | |
| 5,125,577 | A | 6/1992 | Frankel | |
| 6,679,438 | B1 * | 1/2004 | Didlo | B05B 1/28 239/499 |
| 10,822,156 | B2 * | 11/2020 | Callahan | B65D 83/30 |
| 2015/0352583 | A1 * | 12/2015 | Anderson | B05B 1/28 239/288 |
| 2022/0226852 | A1 | 7/2022 | Hostetler | |

OTHER PUBLICATIONS

Non-Final Office Action dated Jul. 29, 2025 relating to U.S. Appl. No. 18/451,889, filed Aug. 18, 2023.

* cited by examiner

*Primary Examiner* — Steven J Ganey
(74) *Attorney, Agent, or Firm* — Dinsmore & Shohl LLP

(57) ABSTRACT

Disclosed herein are fluid deflection devices and methods for deflecting fluid from a fluid distributor outlet. The fluid deflection device includes a body forming an enclosure, the enclosure having a first end and a second end, a first opening formed in the first end of the enclosure, a second opening formed in the second end of the enclosure, and the first opening configured to be placed around a fluid distributor outlet. The method for deflecting a fluid includes the steps of: placing a fluid deflecting device around a fluid distributor outlet; and latching the fluid deflecting device to the outlet of the fluid distribution system.

20 Claims, 10 Drawing Sheets

DEVICES AND METHODS FOR THE DEFLECTION OF FLUID

CROSS-REFERENCE TO RELATED APPLICATION

This application claims priority to U.S. Provisional Application Ser. No. 63/325,019 filed on Mar. 29, 2022, the entirety of which is hereby incorporated by reference.

TECHNICAL FIELD

The present specification generally relates to devices and methods for deflection of fluid and, more specifically, devices and methods for deflection of fluid from a fluid distributor outlet.

BACKGROUND

Fluid distribution outlets such as hoses and spigots may include devices to prevent backflow into the fluid distribution system, such as vacuum breakers and backflow preventers. In some locations, such devices may be required by law. In operation, these devices may splash water in various directions, including onto a user, when the hose or spigot is closed.

SUMMARY

Fluid distributor outlets may be used to dispense water or other fluids. Some fluid distributor outlets may include a backflow preventer or vacuum breaker attached near the fluid distributor outlet. Such devices may prevent potential contaminants from entering potable water supplies by preventing fluid from flowing backwards though pipes. Instead, the fluid is ejected from the fluid distributor outlet when the fluid supply is halted (such as by closing a valve along the fluid supply). This ejection of fluid may cause the fluid to splash in various directions out of the fluid distributor outlet, which may send the fluid in undesired directions such as towards a user. Conventional fluid distributor outlets may allow fluid to be ejected freely and travel in all directions. Therefore, there exists a need for a fluid deflection device which can be coupled to the fluid distributor outlet so that when a backflow prevention device causes a splash of fluid to be ejected from the fluid distributor outlet the splash of fluid may be deflected in a desired direction.

Embodiments generally include a body including a first end and a second end. The body is rotated about an axis to form an enclosure. The enclosure may be coupled to a fluid distributor outlet so that the enclosure may deflect fluid ejected from the fluid distributor outlet.

In one embodiment, a device for deflecting fluid includes a body forming an enclosure, the enclosure having a first end and a second end, a first opening formed in the first end of the enclosure, a second opening formed in the second end of the enclosure, and the first opening configured to be placed around a fluid distributor outlet.

In another embodiment, a method for deflecting fluid, includes the steps of: placing a fluid deflecting device around a fluid distributor outlet; and latching the fluid deflecting device to the outlet of the fluid distribution system.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
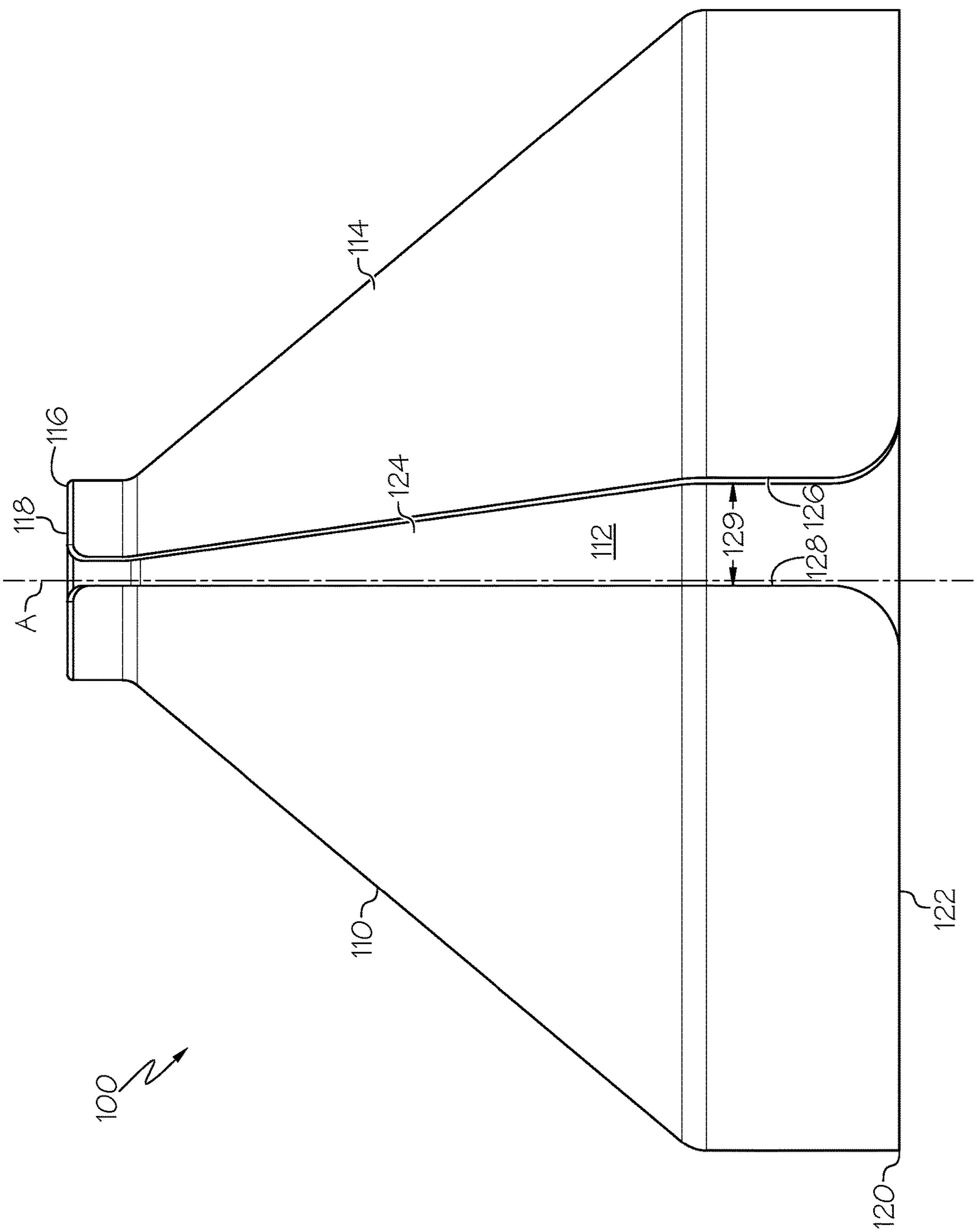
FIG. 1 schematically depicts a side view of an example fluid deflection device, according to one or more embodiments shown and described herein.

Embodiments described herein are directed to a fluid deflection device that includes a body for deflecting fluid. The device includes an outer surface, a first end with a first opening, and a second end with a second opening. The first end may be placed around a fluid distributor outlet, and the surface may deflect fluid ejected from the fluid distributor outlet away from a user. Conventional fluid distributor outlets may eject fluid in various directions including towards a user when a backflow preventer ejects fluid out of the fluid distributor outlet. The embodiments of the present disclosure address the above issues by deflecting fluid in a controlled direction. Various embodiments of the device and method and the operation of the device and method are described in more detail herein. Whenever possible, the same reference numerals will be used throughout the drawings to refer to the same or like parts.

Referring now to FIG. 1, an example fluid deflection device is illustrated according to one or more embodiments described herein. The fluid deflection device 100 includes a body 110. The body 110 includes an inner face 112 and an outer face 114. The body 110 further includes a first edge 126 and a second edge 128. The body 110 further includes a first end 116 and a second end 120. The body 110 may be any suitable material, including but not limited to plastic or rubber. The body 110 may be flexible so that the body 110 may be folded and unfolded around axis A to form the enclosure 124. In some embodiments, the body 110 may be a transparent or translucent material, such that a user may see through the fluid deflection device 100.

The body 110 wraps around axis A to form an enclosure 124. As illustrated, the first edge 126 and the second edge 128 do not touch one another, such that a slit 129 is formed between the first edge 126 and the second edge 128. In other embodiments described herein, the first edge 126 and the second edge 128 do touch one another, such that no slit 129 is formed between the first edge 126 and the second edge 128 and the body 110 spans the entire enclosure 124 around axis A.

The enclosure 124 includes a first opening 118. The first opening 118 may be any suitable shape, including but not limited to a circle, a rectangle, an oval, a hexagon, or any other suitable shape to match that of a fluid distributor outlet. The enclosure 124 further includes a second opening 122. The second opening 122 may be any suitable shape, including but not limited to a circle, a rectangle, an oval, a hexagon, or any other suitable shape. The body 110 may have a straight profile between the first opening 118 and the second opening 122 such that a taper is formed between the first opening 118 and the second opening 122. However, as will be described in further detail herein, the body 110 may have any suitable profile between the first opening 118 and the second opening 122.

As illustrated, the second opening 122 has a larger diameter than the first opening 118. However, it should be understood that the first opening 118 and the second opening 122 may have the same diameter, or the first opening 118 may have a larger diameter than the second opening 122.

Figure 2:
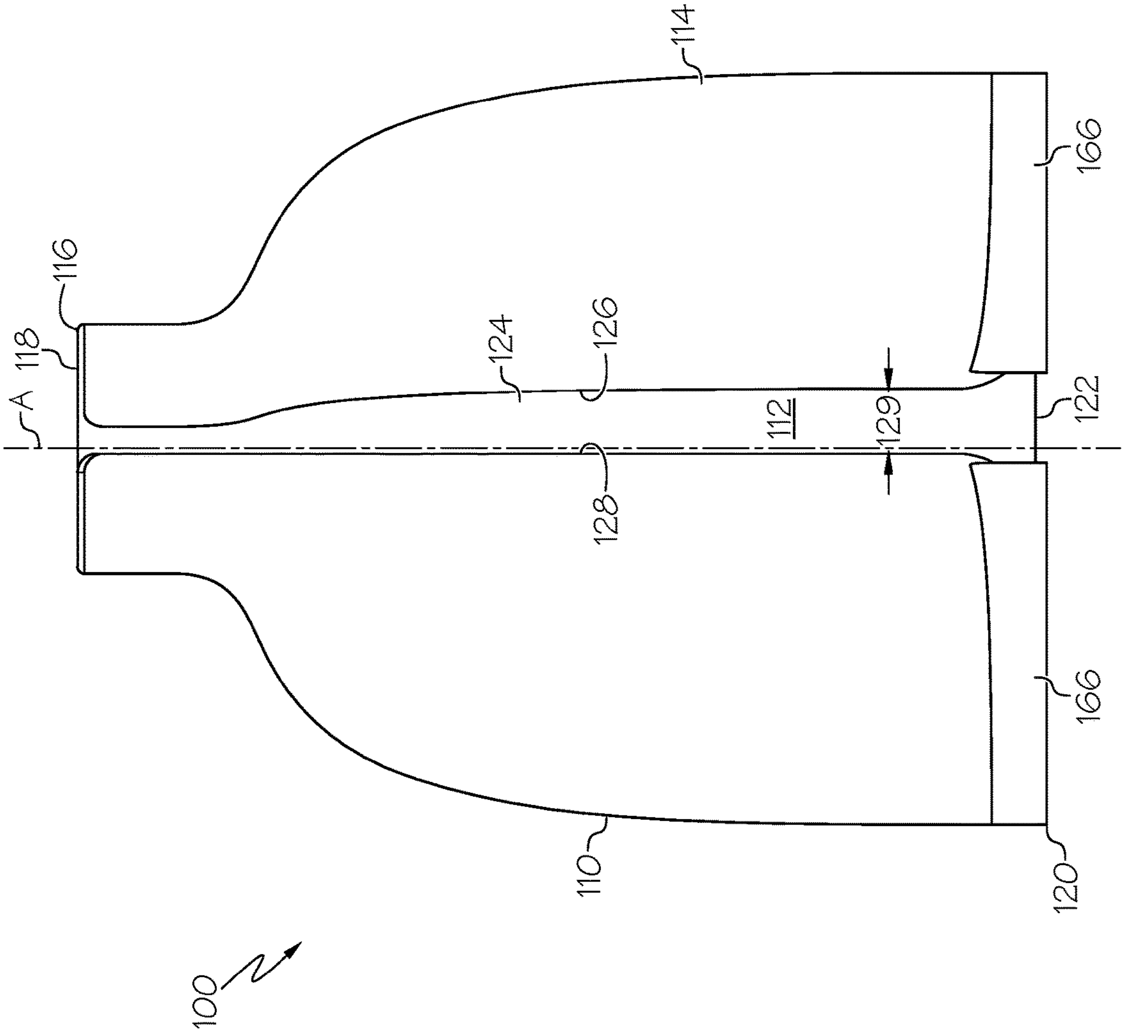
FIG. 2 schematically depicts a side view of an example fluid deflection device, according to one or more embodiments shown and described herein.

Referring now to FIG. 2, a fluid deflection device 100 is illustrated according to one or more embodiments described herein. The body 110 has a radiused profile between the first opening 118 and the second opening 122. While the body 110 is shown with a convex profile between the first opening 118 and the second opening 122, it should be understood that the body 110 may also have a concave profile.

A scratch protector 166 is coupled to the second end 120 of the body 110. The scratch protector 166 has a rounded profile such that the rounded portion of the scratch protector 166 faces away from the enclosure 124. The scratch protector 166 may cover any burrs, edges, etc. on the second end 120 of the body 110. The scratch protector 166 may prevent cuts to a hand of an operator when the operator inserts their hand inside of the enclosure 124, as will be described in more detail herein. The scratch protector 166 may be any suitable material for protecting the user, including but not limited to rubber, silicone, or foam.

Figure 3:
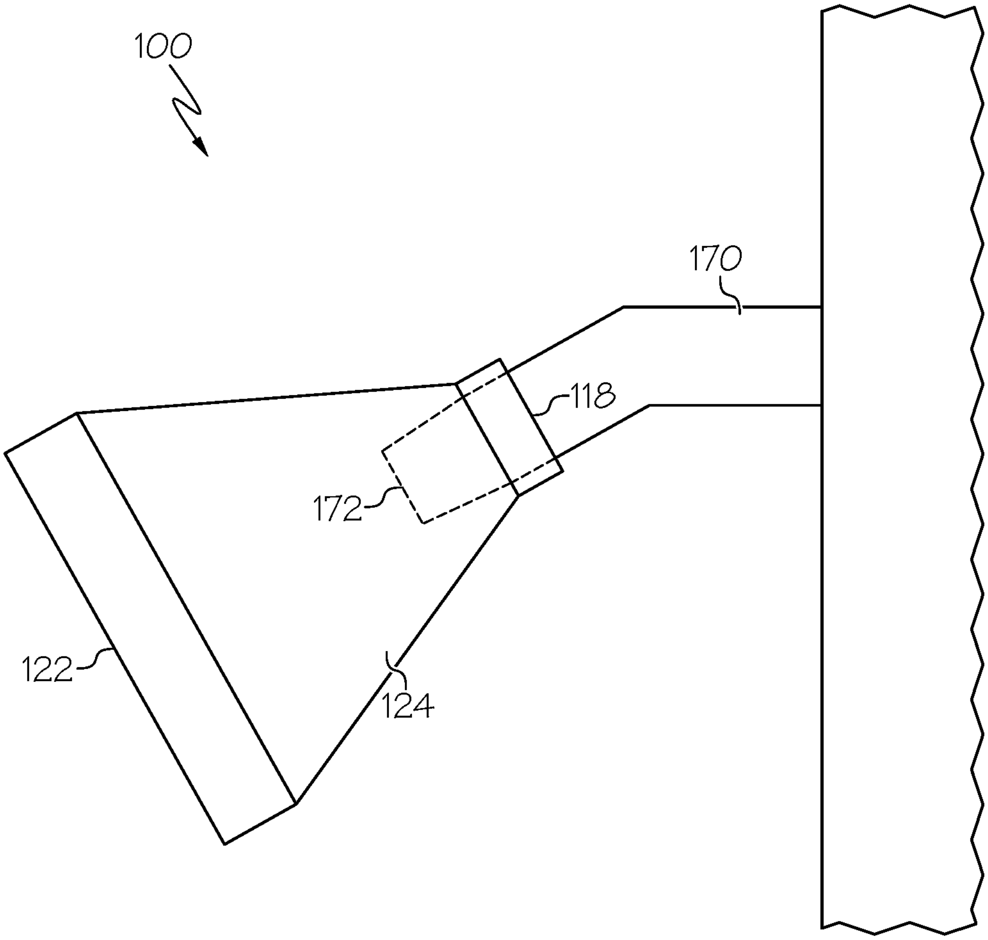
FIG. 3 schematically depicts a side view of an example fluid deflection device arranged around a fluid distributor outlet, according to one or more embodiments shown and described herein.

Referring now to FIG. 3, a fluid deflection device 100 be placed around a fluid distributor outlet 172 is illustrated according to one or more embodiments described herein. The fluid distributor 170 may be a hose, a spigot, a faucet, or any other suitable distributor for flowing fluid. The fluid distributor 170 includes a fluid distributor outlet 172 (shown in phantom) which allows for fluid to flow out of the fluid distributor 170. In some embodiments, the fluid distributor outlet 172 may include a vacuum breaker or a backflow preventer.

The fluid deflection device 100 is placed around the fluid distributor outlet 172, such that the fluid distributor outlet 172 is contained within the enclosure 124. When the fluid distributor outlet 172 is closed, such as by closing a valve or otherwise halting the fluid supply to the fluid distributor outlet 172, a volume of fluid may splash from the fluid distributor outlet 172 in all directions. The fluid deflection device 100 deflects fluid away from the user so that the user is not splashed by the volume of fluid splashing from the fluid distributor outlet 172.

The first opening 118 may be coupled to the fluid distributor outlet 172 such that the fluid distributor outlet 172 is contained within the enclosure 124 of the fluid deflection device 100. The first opening 118 may be coupled to the fluid distributor outlet 172 by any suitable coupling mechanism. As a non-limiting example, the first opening 118 may be an interference fit over the fluid distributor outlet 172, such that the first opening 118 is deformed to fit around the fluid distributor outlet 172. Other possible coupling mechanisms will be described in further detail below.

The second opening 122 of the enclosure 124 may be sufficiently sized so as to allow a user to access the fluid distributor outlet 172 to couple attachments to the fluid distributor outlet 172 such as a hose, a spray wand, a nozzle, a pressure washer, or other suitable attachments. When the fluid deflection device 100 comprises a transparent or translucent material, the operator may be able to more easily see the fluid distributor outlet 172 to more easily couple attachments to the fluid distributor outlet 172.

Figure 4:
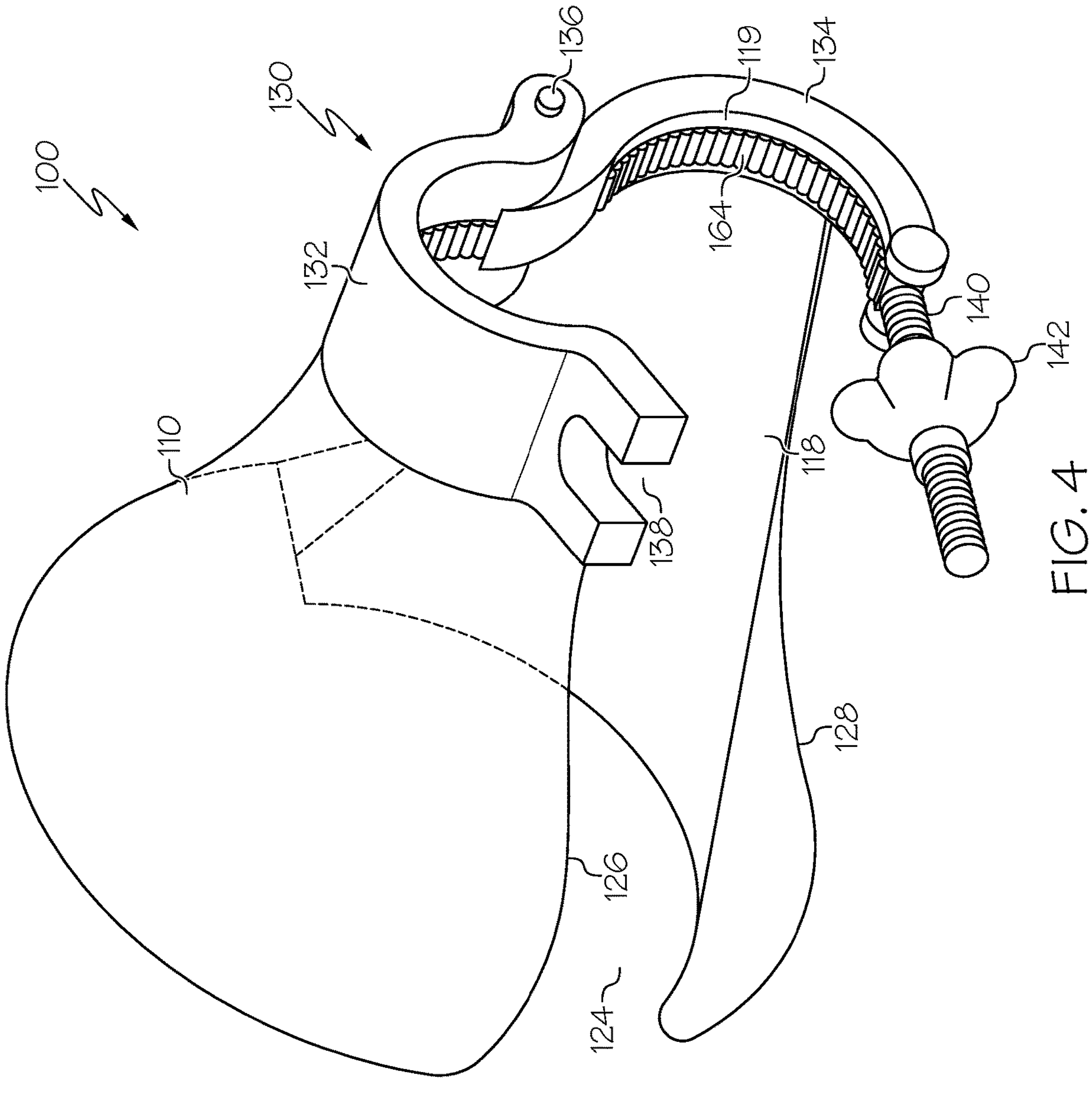
FIG. 4 schematically depicts a perspective view of an example fluid deflection device and a latch, according to one or more embodiments shown and described herein.

Referring now to FIG. 4, a perspective view of a fluid deflection device 100 and a clamp 130 is illustrated according to one or more embodiments described herein. The clamp 130 includes a first segment 132 coupled to the outer face 114 of the body 110 adjacent to the first end 116 of the body 110. The first segment 132 includes a slot 138 formed therein. The slot 138 may overhang the first edge 126 of the body 110. The clamp 130 further includes a second segment 134 coupled to the outer face 114 of the body 110 adjacent to the first end 116 of the body 110. The second segment 134 has a threaded screw 140 rotatably coupled thereto. The threaded screw 140 may overhang the second edge 128 of the body 110. The first segment 132 and the second segment 134 are rotatably coupled to one another via a hinge 136. The threaded screw 140 is placed within the slot 138 and a threaded nut 142 may tighten the threaded screw 140, such that the clamp 130 tensions the first opening 118 of the enclosure 124 against the fluid distributor outlet 172. While a threaded screw 140 and threaded nut 142 are shown, it should be understood that any suitable fastening mechanism may be used to tension the clamp 130 against the fluid distributor outlet 172, including but not limited to a spring loaded fastening mechanism or a cam-locking fastening mechanism.

The first opening 118 includes an inner face 119. The inner face 119 may have a plurality of ridges 164 or other similar serrated features. The ridges 164 may press against into the fluid distributor outlet 172 (not shown) such that the fluid deflection device 100 has a higher holding force on the fluid distributor outlet 172 compared to an embodiment without ridges 164.

Figure 5:
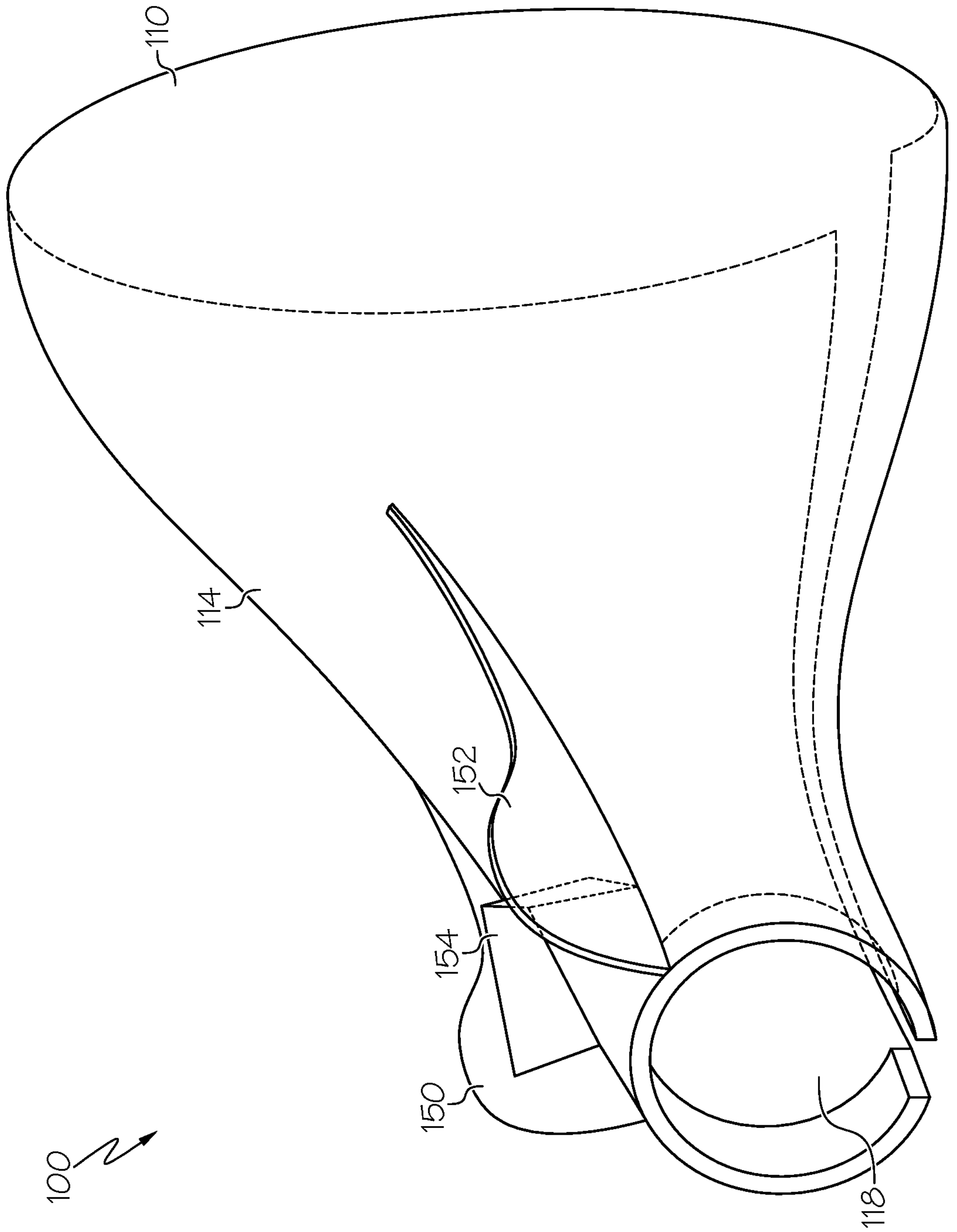
FIG. 5 schematically depicts a perspective view of an example fluid deflection device with a plurality of tabs and a spring element, according to one or more embodiments shown and described herein.

Referring now to FIG. 5, a perspective view of an example fluid deflection device 100 with a plurality of tabs and a spring element 154 is illustrated according to one or more embodiments described herein. A first tab 150 is coupled to the outer face 114 of the body 110. A second tab 152 is coupled to the outer face 114 of the body 110. Both the first tab 150 and the second tab 152 may be made of the same material as the body 110, such as plastic, rubber, or any other suitable material. In other embodiments, the first tab 150 and the second tab 152 may be made of different materials than the body 110, such as a non-limiting example of the body 110 being made of rubber and the first tab 150 and the second tab 152 being made of plastic. The first tab 150 and the second tab 152 may be made of different materials than one another, such as the first tab 150 being made of plastic and the second tab 152 being made of rubber. The first tab 150 and the second tab 152 may be any suitable shape, including but not limited to semi-circular, rectangular, irregularly-shaped, or any other suitable shape.

The first tab 150 and the second tab 152 may be coupled to the outer face 114 of the body 110 adjacent to the first end 116. However, it should be understood that the first tab 150 and the second tab 152 may be coupled to the outer face 114 of the body 110 at any suitable location along outer face 114.

The spring element 154 is coupled to the first tab 150 and the second tab 152. The spring element 154 spans the space between the first tab 150 and the second tab 152 such that the spring element 154 does not traverse over the slit 129. The spring element 154 may be any suitable material, including but not limited to plastic or metal. The spring element 154 may also be any suitable type of spring, including but not limited to a coil spring, a torsion spring, a plate spring, a leaf spring, a disc spring, or any other suitable type of spring.

The user may pinch the first tab 150 and the second tab 152 towards one another to compress the spring element 154 and increase the size of the first opening 118. By increasing the size of the first opening 118, the user may more easily place the first opening 118 around the fluid distributor outlet 172 (not shown). After the user has placed the first opening 118 around the fluid distributor outlet 172, the user may release the first tab 150 and the second tab 152 which allows for the spring element 154 to rebound. The force of the spring element 154 rebounding reduces the size of the first opening 118 so that the first opening 118 is tensioned against the fluid distributor outlet 172.

Figure 6:
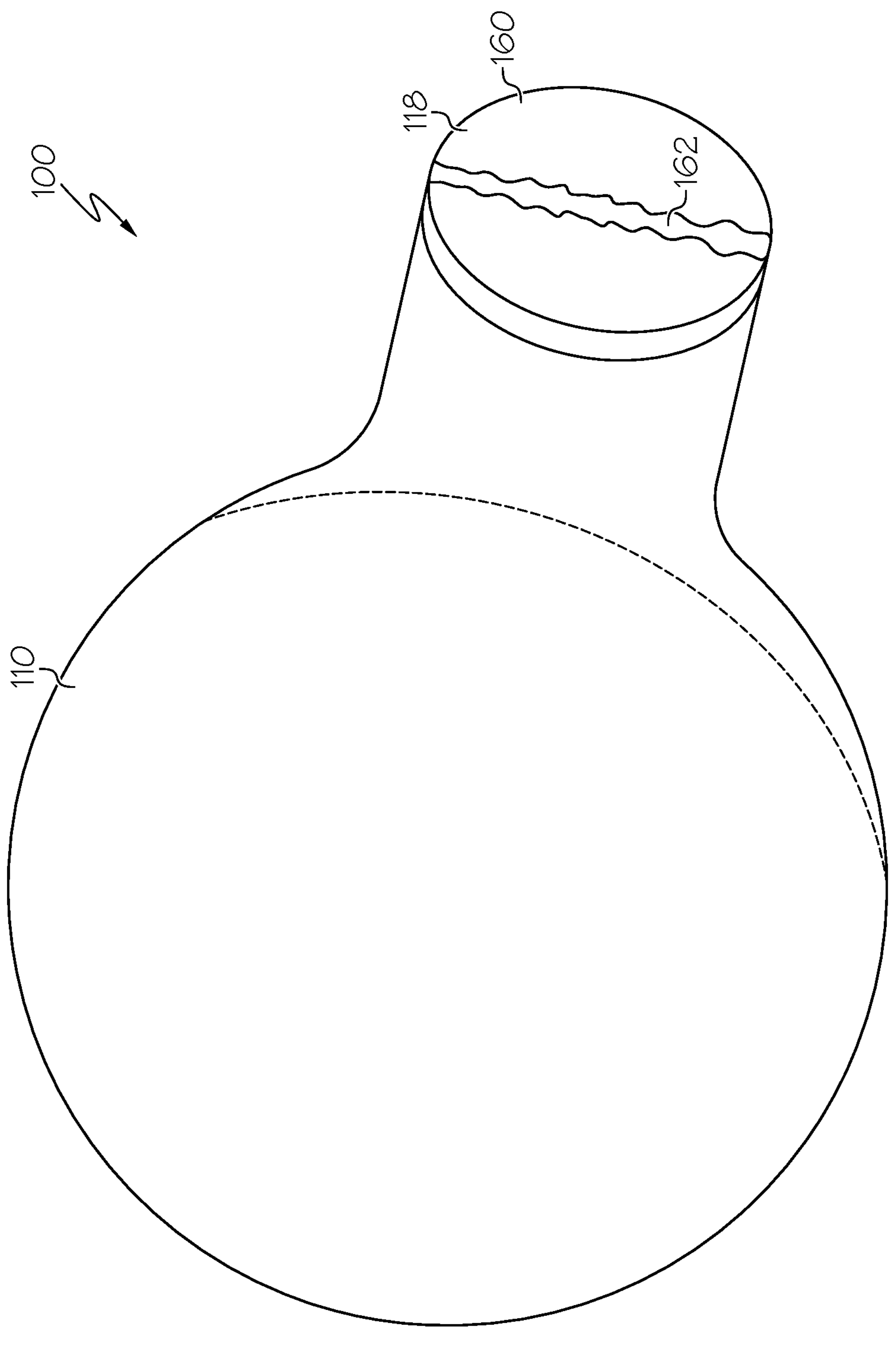
FIG. 6 schematically depicts a perspective view of an example fluid deflection device with a gripping material placed over the first opening, according to one or more embodiments shown and described herein.

Referring now to FIG. 6, a perspective view of an example fluid deflection device 100 with a gripping material 160 placed over the first opening 118 is illustrated according to one or more embodiments described herein. The body 110 does not have a first edge 126 or a second edge 128 such that the body 110 is continuous over the enclosure 124.

The gripping material 160 may be a compliant material such as rubber, silicone, or any other suitable compliant material. The gripping material 160 has an orifice 162 disposed therein. As illustrated, the orifice 162 has an irregular shape, but it should be understood that the orifice 162 may be any suitable shape, including but not limited to a circle, a rectangle, an oval, a hexagon, or any other suitable shape.

The orifice 162 may be placed around the fluid distributor outlet 172 (not shown). The orifice 162 may deform around the fluid distributor outlet 172 so as to grip the fluid distributor outlet 172. The compliance of the material making up the gripping material 160 allows the orifice 162 to stretch to accommodate the size and shape of the fluid distributor outlet 172.

Figure 7A:
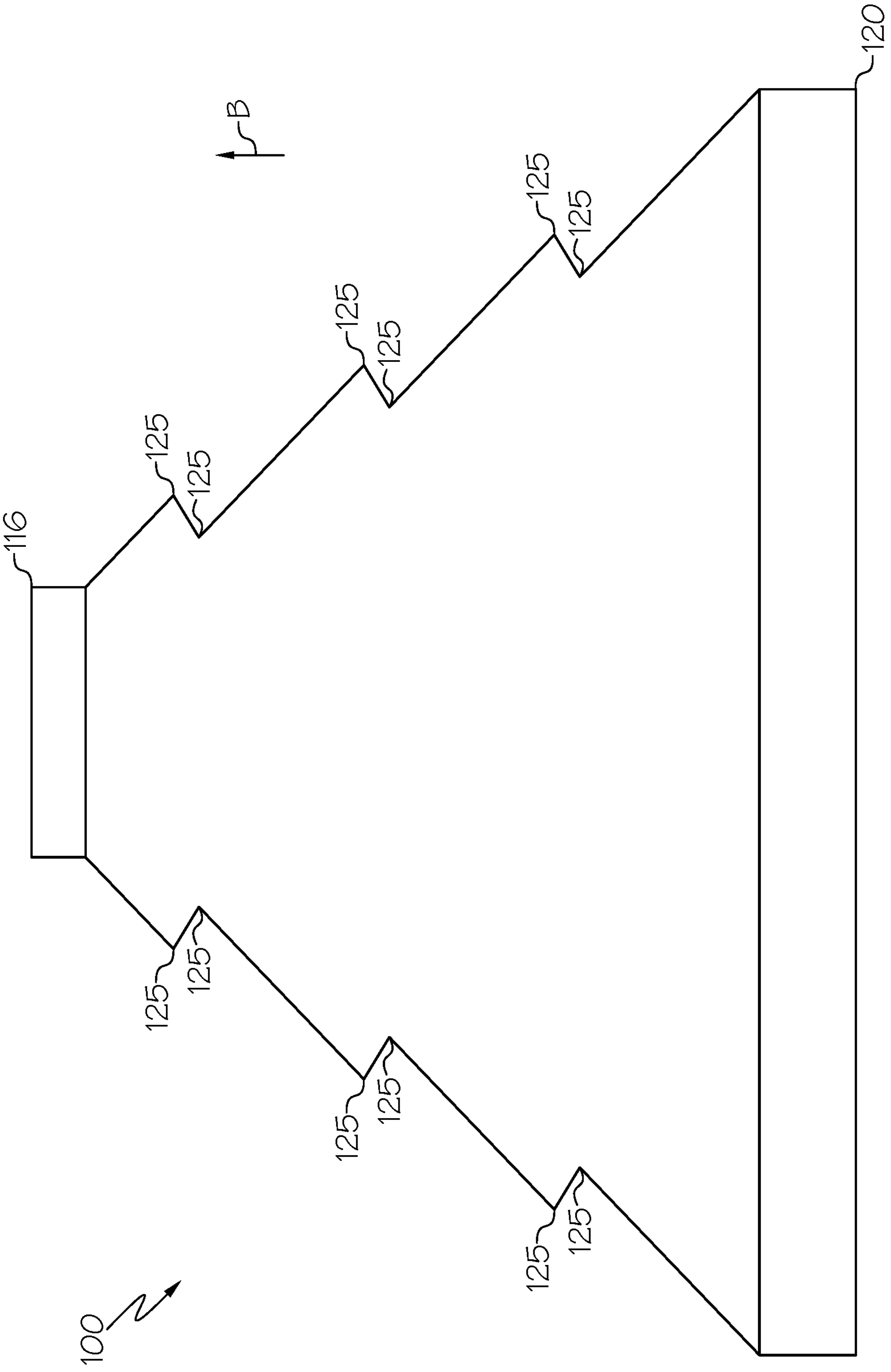
FIG. 7A schematically depicts a side view of an example collapsible fluid deflection device, according to one or more embodiments shown and described herein.

Referring now to FIG. 7A a side view of a collapsible fluid deflection device 100 is illustrated according to one or more embodiments described herein. The fluid deflection device 100 includes a plurality of collapsing zones 125. As illustrated, the plurality of collapsing zones 125 are angled, but it should be understood that the plurality of collapsing zones 125 may be radiused. The plurality of collapsing zones 125 allow for the body 110 to fold upon itself such that the second end 120 moves towards the first end 116 along arrow B. The operator may apply a force to the second end 120 to collapse the fluid deflection device 100. By collapsing the fluid deflection device 100, the operator may attach larger attachments to the fluid distributor outlet 172 or otherwise increase access to the fluid distributor outlet 172.

While a specific number of collapsing zones 125 are illustrated, it should be understood that any suitable number of collapsing zones 125 may be used, including but not limited to one collapsing zone 125, two collapsing zones 125, five collapsing zones 125, ten collapsing zones 125, or any other suitable number of collapsing zones 125.

Figure 7B:
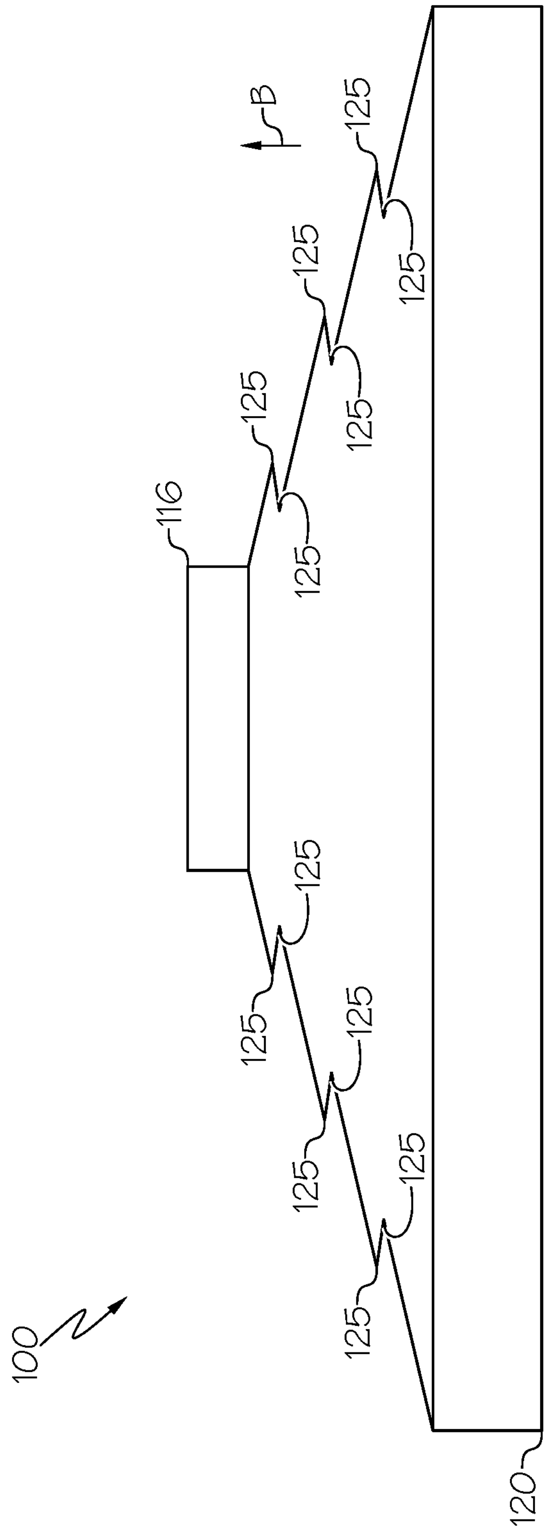
FIG. 7B schematically depicts a side view of an example collapsed fluid deflection device, according to one or more embodiments shown and described herein.

Referring now to FIG. 7B, a side view of a collapsed fluid deflection device 100 is illustrated according to one or more embodiments described herein. The plurality of collapsing zones 125 are collapsed such that the distance between the first end 116 and the second end 120 is reduced. While all of the collapsing zones 125 are shown as collapsed, it should be understood that only a portion of the collapsing zones 125 may be collapsed such that the fluid deflection device 100 is only partially collapsed.

Figure 8:
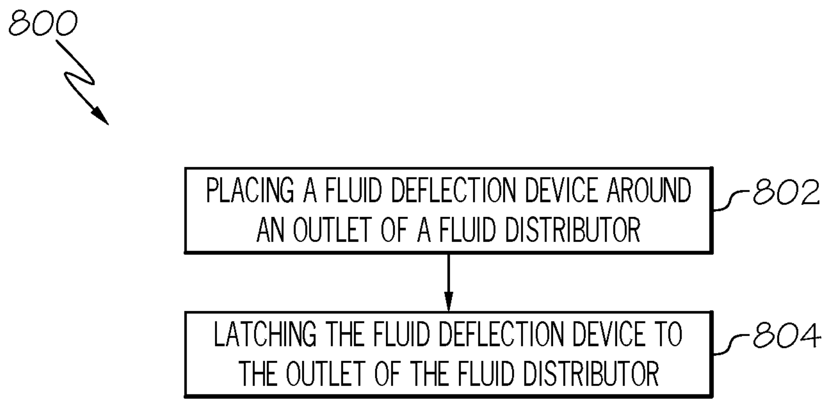
FIG. 8 depicts a flowchart of an example method for deflecting fluid according to one or more embodiments shown and described herein.

Referring now to FIG. 8, the steps of a method for deflecting fluid is described. With reference to FIGS. 1-6, at block 802 the method 800 includes placing the fluid deflection device 100 around a fluid distributor outlet 172. That is, the first end 116 of the fluid deflection device 100 is placed around the fluid distributor outlet 172 by any suitable means, such as those described above. As a non-limiting example, the first end 116 is placed around the fluid distributor outlet 172 by spreading the body 110 around the fluid distributor outlet 172 or by stretching the first opening 118 around the fluid distributor outlet 172 such as in an interference fit between the first opening 118 and the fluid distributor outlet 172. At block 804, the method 800 includes latching the fluid deflection device 100 to the fluid distributor outlet 172. That is, the first opening 118 of the fluid deflection device 100 is latched to the fluid distributor outlet 172 by any suitable means, such as those described above. As a non-limiting example, the threaded nut 142 may be threaded onto the threaded screw 140, the gripping material 160 may be deformed to grip the fluid distributor outlet 172, or the spring element 154 may tension the first opening 118 to the fluid distributor outlet 172.

Figure 9:
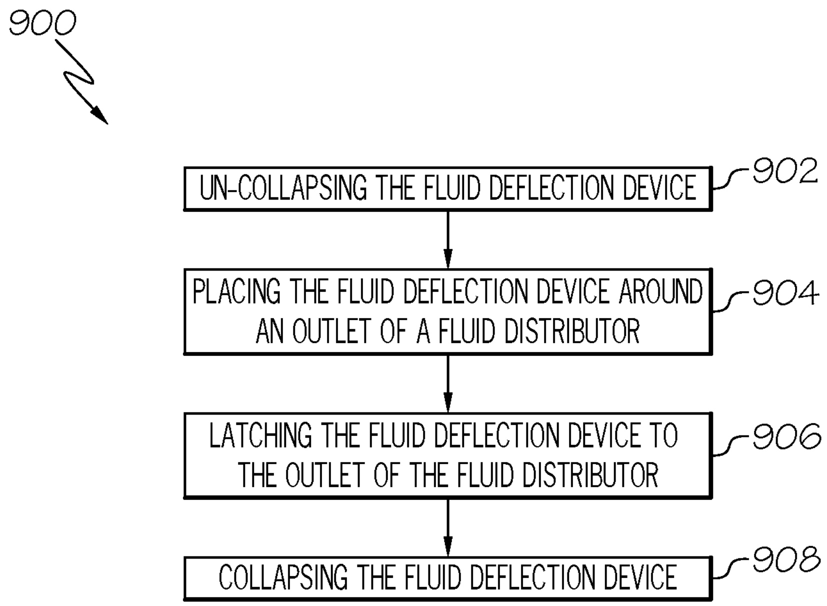
FIG. 9 depicts a flowchart of an example method for deflecting fluid according to one or more embodiments shown and described herein.

Referring now to FIG. 9, the steps of a method for deflecting fluid is described. With reference to FIGS. 1-7B, at block 902, the method 900 includes un-collapsing the fluid deflection device 100. That is, the fluid deflection device 100 may be in a collapsed state such as for storage. The user may un-collapse the fluid deflection device 100 by pulling the second end 120 away from the first end 116. At block 902 the method 900 includes placing the fluid deflection device 100 around a fluid distributor outlet 172. That is, the first end 116 of the fluid deflection device 100 is placed around the fluid distributor outlet 172 by any suitable means, such as those described above. As a non-limiting example, the first end 116 is placed around the fluid distributor outlet 172 by spreading the body 110 around the fluid distributor outlet 172 or by stretching the first opening 118 around the fluid distributor outlet 172 such as in an interference fit between the first opening 118 and the fluid distributor outlet 172. At block 906, the method 900 includes latching the fluid deflection device 100 to the fluid distributor outlet 172. That is, the first opening 118 of the fluid deflection device 100 is latched to the fluid distributor outlet 172 by any suitable means, such as those described above. As a non-limiting example, the threaded nut 142 may be threaded onto the threaded screw 140, the gripping material 160 may be deformed to grip the fluid distributor outlet 172, or the spring element 154 may tension the first opening 118 to the fluid distributor outlet 172. At block 908, the method 900 includes collapsing the fluid deflection device 100. That is, a force may be applied to the second end 120 to collapse the fluid deflection device 100 towards the first end 116.

Accordingly, a need exists for a fluid deflection device that may be coupled to a fluid distributor outlet. The device includes a body which may be wrapped around an axis to create an enclosure. The enclosure may deflect fluid ejected from the fluid distributor outlet, such as fluid ejected from the fluid distributor outlet by a back pressure device.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential devices of the various embodiments described in this disclosure, even in casings where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The invention claimed is:

1. A device for deflecting water, the device comprising:
a body forming an enclosure, the enclosure having a first end and a second end;
a first opening formed in the first end of the enclosure;
a second opening formed in the second end of the enclosure; and
the first opening configured to be placed around an outlet of a spigot and an attachment coupled to the outlet of the spigot, wherein the device deflects water that sprays outward at the outlet of the spigot.

2. The device of claim 1, wherein the body comprises a first edge and a second edge, wherein there is a slit formed between the first edge and the second edge across a length of the body between the first opening and the second opening.

3. The device of claim 2, further comprising:
a clamp coupled to the body adjacent to the first opening, wherein the clamp comprises:
a first segment comprising a slot;
a hinge coupled to the first segment;
a second segment coupled to the first segment via the hinge; and
a fastening mechanism coupled to the second segment, wherein the fastening mechanism couples to the first segment via the slot in the first segment.

4. The device of claim 3, wherein the fastening mechanism comprises a threaded screw and a threaded nut.

5. The device of claim 2, further comprising:
a first tab mounted to the body; and
a second tab mounted to the body.

6. The device of claim 5, further comprising:
a spring disposed between the first tab and the second tab.

7. The device of claim 1, wherein the second opening has a larger diameter than the first opening.

8. The device of claim 1, wherein the body comprises a transparent material.

9. The device of claim 1, further comprising:
a gripping material placed over the first opening; and
an orifice formed in the gripping material, wherein the orifice is configured to be placed around the outlet of the spigot.

10. The device of claim 9, wherein the gripping material is rubber.

11. The device of claim 1, wherein the first end is an interference fit to the outlet of the spigot.

12. The device of claim 1, wherein:
the first opening further comprises an inner face; and
a plurality of ridges are coupled to the inner face of the first opening.

13. The device of claim 1, wherein the body is collapsible.

14. The device of claim 1, further comprising:
a scratch protector placed over the second end of the body.

15. The device of claim 1, wherein one of a vacuum breaker and a backflow preventer is coupled to the spigot.

16. A method for deflecting water from a spigot, the method comprising the steps of:
placing a fluid deflecting device around an outlet of the spigot, wherein one of a vacuum breaker and a backflow preventer is coupled to the outlet of the spigot, and the vacuum breaker or the backflow preventer is at least partially enclosed by the fluid deflecting device; and
latching the fluid deflecting device to the outlet of the spigot.

17. The method of claim 16, wherein the step of latching the fluid deflecting device to the outlet of the spigot further comprises threading a threaded nut onto a threaded screw.

18. The method of claim 16, wherein the fluid deflecting device further comprises a first tab and a second tab, and wherein the step of placing the fluid deflecting device around the outlet of the spigot further comprises:
pinching the first tab and the second tab;
placing the fluid deflecting device around the fluid deflecting device; and
releasing the first tab and the second tab.

19. The method of claim 16, further comprising the step of:
un-collapsing the fluid deflecting device prior to ejection of water from the spigot; and
collapsing the fluid deflecting device after ejection of water from the spigot.

20. The device of claim 1, wherein the attachment comprises one of a vacuum breaker and a backflow preventer, and the vacuum breaker or the backflow preventer is at least partially enclosed by the fluid deflecting device.

* * * * *